(12) United States Patent
Hu (10) Patent No.: US 9,468,157 B2
(45) Date of Patent: Oct. 18, 2016

(54) THREE-DIMENSIONAL PLANTING CONSTRUCTION

(76) Inventor: Xiangyu Hu, Huangshi (CN)

( * ) Notice: Subject to any disclaimer, the term of this patent is extended or adjusted under 35 U.S.C. 154(b) by 317 days.

(21) Appl. No.: 13/127,709

(22) PCT Filed: Nov. 5, 2009

(86) PCT No.: PCT/CN2009/074797
§ 371 (c)(1),
(2), (4) Date: May 5, 2011

(87) PCT Pub. No.: WO2010/051755
PCT Pub. Date: May 14, 2010

(65) Prior Publication Data
US 2011/0209402 A1 Sep. 1, 2011

(30) Foreign Application Priority Data

Nov. 6, 2008 (CN) .......................... 2008 1 0172654

(51) Int. Cl.
*A01G 9/12* (2006.01)
*E04H 1/04* (2006.01)
*E04H 1/06* (2006.01)

(52) U.S. Cl.
CPC *A01G 9/12* (2013.01); *E04H 1/04* (2013.01); *E04H 1/06* (2013.01); *Y02P 60/12* (2015.11); *Y02P 60/122* (2015.11)

(58) Field of Classification Search
CPC .... A01G 9/14; A01G 9/1438; A01G 9/1469; A01G 9/16; A01G 9/18; A01G 9/20; A01G 9/24; A01G 9/247; A01G 9/26; A01G 13/02; A01G 25/00; A01G 9/12

USPC .......... 47/17, 20.1, 21.1, 29.5, 39, 48.5, 79, 47/82, 83, 86, 87
IPC .................. A01G 9/00,13/02, 7/00, 25/00, 9/02
See application file for complete search history.

(56) References Cited

U.S. PATENT DOCUMENTS

| | | | | |
|---|---|---|---|---|
| 5,445,094 A | * | 8/1995 | Kai et al. | 114/65 R |
| 5,524,387 A | * | 6/1996 | Whisenant | 47/79 |
| 5,544,474 A | * | 8/1996 | Finkelstein | 56/10.2 A |
| 5,655,335 A | * | 8/1997 | Vermeer | 52/66 |
| 5,826,375 A | * | 10/1998 | Black | 47/67 |
| 6,901,698 B2 | * | 6/2005 | Manning | 47/48.5 |
| 2005/0252080 A1 | * | 11/2005 | Wright | 47/79 |
| 2007/0199241 A1 | * | 8/2007 | Peleszezak | 47/65.9 |
| 2009/0107038 A1 | * | 4/2009 | Wan | 47/22.1 |

FOREIGN PATENT DOCUMENTS

JP 2003210040 * 7/2003

* cited by examiner

*Primary Examiner* — Thien Thanh Pham (57) ABSTRACT

A three-dimensional planting construction comprises a three-dimensional framework (46), some water (5) and soil (4) for plants (22) to grow and some turnover shutters (16) for adjusting lighting in which water (5), soil (4) and the turnover shutters (16) are provided on the three-dimensional framework (46). The three-dimensional framework (46) made from concrete and wood is built around the building (10), other buildings or ground. Wind power generator sets (39) supply power to the planting construction. An overhead trolley (43) is installed on the three-dimensional framework (46) for working. The plants (22) are irrigated with a pump (37) from a well or waste water purified roughly.

7 Claims, 6 Drawing Sheets

THREE-DIMENSIONAL PLANTING CONSTRUCTION

BACKGROUND OF THE PRESENT INVENTION

1. Field of Invention

The present invention relates to a three-dimensional planting construction in which water, soil and wind power are comprehensively used in buildings and constructions, and the present invention involves constructional reinforced concrete, wood structure, water supply and drainage, wind power generation, and mechanical drive.

2. Description of Related Arts

Cities around the world are constantly increasing both in number and in size. Whereas urban vegetation, though its areas rising or falling according to each specific circumstances, fails to catch up with the development and expansion of cities. During and the development of construction, at least two thirds of the original vegetation has been destroyed. Even through vegetation is replanted after the buildings have been finished, the maximum area of the replanted vegetation is one third of the total developed area. In addition, there are various emissions of greenhouse gases, waste gases from factories and motor vehicles. Regions bordering deserts are often threatened by pollution from sand storms. The rising temperature of the earth brings threats and challenges to human beings.

At present, planting vegetation is generally based on the ground, which utilizes the characteristics of various plants to expand the vertical and horizontal areas of vegetation. Other afforesting solution is planted vegetation on balconies and rooftop of high-rise buildings, spare areas beside cloverleaf junctions, and isolation belts on expressways. All the above measures, however, lag far behind the paces of air pollution, vegetation reduction and destruction brought about by urban development and expansion.

SUMMARY OF THE PRESENT INVENTION

The present invention provides a three-dimensional framework to support plants to grow, and to hold water, soil, electricity and mechanical drive which are essential conditions for plant growth. The present invention can generate more green shade, more fresh air and more oxygen for various houses, buildings or other locations. In summer, a great many green plants can lower room temperature so as to reduce the usage time of air-conditioning and decrease the emission of greenhouse gases. Furthermore, the green plants are capable of absorbing toxic gases and treating environmental pollutions. The three-dimensional framework is made of reinforced concrete and wood, and it is built as a high-rising structure around a high-rising building for holding water and soil and form a basis for plants to survive and grow, so as to provide cultivation and maintenance conditions for plants. In this way, the green plants and flowers are capable of being planted at all layers of a building, from the bottom to the top. The present invention also provides a comprehensive technical solution for treating desertification and sandstorm pollution.

I. In order to make it possible for plants to live and grow vertically around various buildings, houses and locations (these buildings, houses and locations will be referred to as background below) so as to achieve a three-dimensional vegetation area, meanwhile, to keep the cost of cultivation and maintenance as low as possible, four types of three-dimensional framework structures are provided in which wooden turnover shutters are used for adjusting the rotation angle of the vegetation so as to provide green shade, sunlight and ventilation. The following are the four types of three-dimensional framework structures and turnover shutters:

A) coupling structure, B) dual-row single-body structure, C) single-row single-body trapezoid helix structure, D) single-row single-body structure (from a horizontal overlook view), E) turnover shutters for adjusting the rotation angle of the vegetation.

II. Three technical solutions for water supply and drainage which are cooperate with soil and sand:

A) The water that is used by the residents in the building and is not heavily contaminated (excluding toilet flush water and toxic waste water) is able to be directly introduced into the water and soil troughs through water conduits which are constructed along the building for plants to absorb and use. B) Water which is used for plants to absorb and use is supplied by a pumped, wherein the upright columns of the three-dimensional framework are built as water towers and the top beams at the top of the three-dimensional framework are built as communicated water troughs for water storage. C) In order to ensure healthy growth of the plants, redundant water must be drained off. Therefore, a water recycling drainage structure is supplied to maintain the proper humidity of the soil.

III. Power supply makes it possible for supplying water, soil and other maintenance condition for three-dimensional plants and vegetation to grow. Two technical solutions for supplying power on various buildings are as follows:

A) Electric power can be supplied either by wind power generating sets or by power grid, so as to be used for pumping water, operating an overhead trolley and lighting. B) The upright columns of the three-dimensional framework are served as the tower frame of the wind power generating sets, for supplying power.

IV. The technical solution to operate an overhead trolley by electric power for transporting soil and plants up and down and for plants growing, manicuring, maintenance and facility installation.

The first embodiment of the present invention takes high-rise residential buildings or office buildings as background of the three-dimensional framework and applies coupling structure, in which a plurality of upright columns are built around the east, south and west (the east, south and west respectively correspond the directions of sun rising up, climbing to the top and setting down in relation to the earth) of the periphery of the high-rise building, wherein the upright columns parallel with the outside wall of the building and have a certain distance to the outside wall of the building so as to form a three-dimensional framework. A plurality of water and soil beams (WSB) are horizontally built 4 to 5 meters above the upright columns for holding water and soil, and a plurality of vertical water through (WT) is connected to the building. The WT is connected to the drainage pipe of the residence, and waste water flows through WT to WSB. The WSB is divided into an upper layer and a lower layer by a horizontal isolation plate to separate soil and water, wherein the upper layer is soil and the lower layer is water. The section of the water and soil trough 3 is V-shaped. The horizontal isolation plates are laid piece by piece, and there are interstices among the horizontal isolation plates and the WSB. Moreover, there are vertical isolation plates under the horizontal isolation plates for water recycling, and each vertical isolation plate extends one third of a total length of the WSB. On both sides of the upright columns are vertical plates for blockading water and soil. The water flows over from the WT between upright columns and enters the water and soil trough through the water inlet hole under the blockading plates. The sand at the water inlet has a diameter of 3 to 5 mm, and the sand at the middle part and the outlet has a diameter of 0.5 to 1.5 mm. When the water level approaches the horizontal isolation plate, extra water will flow out from the water outlet under the blockading plate at the other end.

At 1.2 to 1.3 meters above the WSB is holding turnover shutters beam (TSB) for holding and supporting turnover shutters. Along the radial direction of the TSB, there are 2 to 6 pairs of ox-horn shaped claws mounted at intervals for holding the axis of the turnover shutters. The external surface of the TSB is tangent to the external surface of the axis of the turnover shutter, so that by pulling the rope inside or outside the turnover shutter, it can be revolved up and down. The upper edge of the turnover shutter can turn downside towards the inner side of the upright column by 120° to 130°, allowing to adjust green shade, direct sunlight or illumination according to requirements. The axis of the turnover shutter is a round fir log with a diameter of 180 to 200 mm, Along the axial direction of the turnover shutter, a plurality of holes are drilled on the turnover shutter at intervals and a plurality of small round logs with diameters of 50 to 60 mm are inserted into those holes respectively. Then square logs with drilled holes are attached onto the ends of those small round logs so as to form a grid. An inner and an outer fiber ropes are provided to respectively fasten the upper and lower edges of the turnover shutter, and all the turnover shutters in different layers are fastened together by the fiber ropes from the top to the ground. The angle of the turnover shutters can thus be adjusted by pulling fiber ropes on the ground.

Plants selected can be grown in the soil of the water and soil trough. Here, most of the plants are vines. The vines are usually cultivated in every water and soil trough which is on both sides of the upright column, and small trees (or variety trees), shrubs and herbs are usually cultivated in the middle, and are to be grafted onto stocks, choosing which types of the plants to be grown should, first of all, be according to the conditions and functions of the three-dimensional framework so as to meet the requirements of adjusting green shade and illumination with vegetation, and secondly according to the adaptability of those plants to the local climate, water and soil.

Vines tend to climb up and cling to other objects around them. We need to pull the vines onto the turnover shutters over the WSB manually, and separate the vines entwined onto the upright posts from those onto the turnover shutters, so that they will not hinder the rotation of the turnover shutters; new-born vine branches need to be tied onto the grid of the turnover shutters with thin ropes The installation and maintenance of the facilities for cultivating, preserving and taking care of the whole three-dimensional vegetation requires manual work and management, which falls into the category of aerial work. In order to guarantee the safety of workers, lessen the intensity of labor, improve the work efficiency and increase the utility of the vegetation, an overhead trolley powered by electricity is to be mounted under the top beam of the three-dimensional framework. According to different types of the three-dimensional framework structures, the slider of the trolley can adopt a straight line structure or a curve structure with straight lines and arc lines. The slider allows the wheel of the overhead trolley to move horizontally, left and right, or in an arc along the slider and to be able to reach every grid of the three-dimensional framework. The height of the upper-most layer is around 5 to 7 meters. The operator is hoisted in a basket up to the tread board at the inner side of the WSB, then he fastens the security rope around the TSB, and fastens the security belt on him onto the rope. Thereby he can start working in absolute safety.

The overhead trolley is powered either with a DC or an AC electric motor, on which pulleys of the overhead trolley are driven to move left or right in horizontal along the edge of the slider by applying force on the axis of the pulleys. Under a pulley supporter is a hoister mechanism, in which the DC or AC electric motor is used to drive a shaft roller to roll up steel cables so as to lift a basket, wherein the lift weight of the hoister mechanism is less than one ton.

When the foot of a high-rise building are large supermarkets, department stores, clubs, or theatres, and when the buildings are auditoriums, smelting factories, or power stations with chimneys, a dual-row single-body structure is applied, wherein the dual-row single-body structure comprise a straight structure and a curve structure (here, curve means the unequal angled curve formed by the oscillating angle on the horizontal plane). The three-dimensional framework is detached from the main body of the building. At a distance of 4 to 8 meters away from the building, a plurality of inner row upright columns are mounted in parallel with the building at the east, south and west directions of the building, and a plurality of outer row upright columns are mounted in parallel with the inner row upright columns and connected to the inner row upright columns by WTs, wherein there is a distance between the inner row upright columns and the outer row upright columns. According to the different height of the three-dimensional framework, the distance between the inner row upright columns and the outer row upright columns is variable. Some upright columns are enlarged in diameter and have hollow centers so as to serve as water tower for storing water. These hollow upright columns are intercepted into several sections at interval of every 3 to 5 layers' height. Each section has a water inlet pipe mounted thereon, air vent holes opened thereon, and a drainage pipe at the bottom of each section. The number of these hollow upright columns taking as water tower is decided by the area of the vegetation planted on the three-dimensional framework.

In the dual-row single-body structure, if there is a protruding part of the three-dimensional framework higher then the background building, along the grid, the turnover shutters are also required to be mounted on the inner side of the protruding part. The WSB is mounted every other layer. On the WSB, there are only shrubs and herbal plants are planted, and there is no vine, so that the turnover shutters are not needed, and lighting and ventilation of the residents are unaffected. The distance from the ground to the first layer of WSB is about 6 to 8 meters, thus it will not interfere with transportation or other daily activities of the residents. Drainage pipe is mounted at every water inlet on the upper entrance of the WSB in each layer. Electro-magnetic valves are used to control the water supply to upper layer of the building from the ground, and a water pump is used to raise water.

Raising water with pump is already a mature technology; its application depends on specific circumstances. For reference, we can consult the book "The Design and Computation of Water Pump and Pumping Station", first published and issued by the Chemical Industry Press in January 2007 in Beijing.

In the areas where there is rather abundant resource of wind energy, the advanced technology of wind power generation can be adopted. Increase the height of upright columns or the water towers 3 to 5 meters, so as to take the upright columns or the water towers as a part of a tower frame which is used to mount the wind power generating set thereon. When the upright columns or the water towers are mounted 3 to 5 meters higher, the cost for building a tower frame of the wind power generating set in the same size will be reduced by about 80 percent, and it will be much more convenient and less costly to maintain and repair the wind power generating set. In addition, there are other advantages in installing small size wind power generating sets only: lower noise pollution—even less than that of cars, stereos and construction machinery; small wind power generating sets can produce electricity any time when the wind velocity is at 3 m/s; the requirement for the time period of power consumption is not strict in this case, and moreover, extra electricity can be stored with energy storage technology to adjust the energy consumption distribution.

The manufacturers of wind power generating sets can guarantee to provide comprehensive services of field surveying, designing, manufacturing, installation and operation of their equipment, which include the Xinjiang Goldwind Science and Technology Co., ltd., Shanghai Shenxin Wind Power Generating Equipments Co., Ltd. For reference, please consult "A Technological Manual for Wind Power Station Engineering", published by the Machinery Industry Press in March 2004.

The above is an explanation of what is in common and what is different between the dual-row single body structure and the coupling structure, and other maintenance structures and operation methods are the same as those of the coupling structure.

For the buildings like wharfs, railway stations, flyovers, factories, auditoriums, squares and so on, where there are houses as well as long distance buildings and large area open land. What they have in common is that the buildings are not very tall, and we usually adopt a single-row single-body trapezoid helix structure, which comprise a straight line helix structure and an oscillation angle helix curve structure. A plurality of upright columns are mounted in parallel with the building at the east, south and west directions of the building so as to form a three-dimensional framework. The height of the three-dimensional framework is limited below 40 meters, and there is no overhead trolley installed thereon. Instead, a climbing ladder is provided for operators to climb up and down for working, and during work, the operators must carry security equipments with them.

For the background buildings like flyovers, auditoriums or squares, it is not necessary to mount turnover shutters on the three-dimensional framework, so as to reduce cost and the expense of maintenance. Instead, the top beams of the three-dimensional framework are built as communicated water troughs for water storage. Drainage pipes are mounted at the bottom of the communicated water troughs. Where there is no power supply and a large amount of water is required, wind power generating sets can be installed to provide electricity. The upright columns can be built with a higher and larger diameter so that they serve not only as either water towers, but also as tower frames for being mounted wind power generating sets thereon.

The above is an explanation of what is in common and what is different between the single-row single body trapezoid helix structure and the other two types of structures mentioned before. As to the vegetation maintenance and usage of the turnover shutters, the single-row single body trapezoid helix structure is same to the other two types of structures mentioned before.

For the lower buildings, such as both sides of expressways and railways, squares, highways and factories, a single-row single-body structure can be adopted. The single-row single-body structure comprises a straight line structure and a curve line structure. A plurality of upright columns are mounted in parallel with the building at the east, south and west directions of the building so as to form a three-dimensional framework. The height of the three-dimensional framework is limited below 20 meters, and there is no overhead trolley installed thereon. Instead, a climbing ladder is provided for operators to climb up and down for working, and during work, the operators must carry security equipments with them. Water can be raised by a pump. The top beams of the three-dimensional framework are built as communicated water troughs for water storage. Drainage pipes are mounted at the bottom of the communicated water troughs. Turnover shutters may not be needed, of course, they can be installed in certain parts when necessary.

The above is an explanation of what is in common and what is different between single-row single-body structure and the other three structures mentioned before. As to the vegetation maintenance and usage of the turnover shutters, the single-row single-body structure is same to the other three structures mentioned before.

All the three-dimensional frameworks mentioned above are 5 to 10 meter higher than the background buildings and other buildings.

The following is a comprehensive treatment of desertification and sandstorm pollution by the three-dimensional structure.

The wind eroded land such as the Gobi and the desert lands neighboring the periphery of the oasis is the main region that threatens the oasis with moving dune and drifting sand. The sandstorm is ferocious and its accumulation speed is very fast. The accumulated sand in stripe form and dunes formed in the sandstorm blanket the green land and the soil to make it difficult for plants to survive. In addition, the rainfall has been scarce but evaporation has been huge all the year round, so plants are not able to grow up naturally. In these regions, people have developed various ways to treat sands: firstly, cultivated trees and grasses are planted to recover natural vegetation; secondly, various engineering measures for sand fixation (using sand barrier to fix sand) have been invented to stabilize sand so as to protect these trees and grasses, e.g. an obstacle is installed on the ground with materials like branches, straws, gravel, laths, wheat stalks, or plastics boards to block sand from drifting, control the direction, velocity and structure of the sand flow. There are two types of sand barriers: caravel barrier and vertical barrier, and the latter barrier further includes three types: high vertical obstacles with a height of 50 to 100 cm; low vertical obstacles with a height of 15 to 50 cm; and semi-concealed obstacles which only have their tops revealed from the ground. Mixed planting of trees, bushes and grasses, differentially treating windward side and leeward side, and forming grass belts and wood belts can all slow down wind velocity, obstruct sand movement and fix sand, They are very effective ways and methods and most of which are worth being recommended and applied in the long run. But for the broad areas of desert border and Gobi desert in our country, the adverse climatic environment near the dry desert land where waterfall is scarce and wind sand is constant all the year round. These measures, however, are far from satisfactory for by these measures, the vegetation development is rather limited in size, takes too long and is too slow to take effect. For reference, please read "Climate Change and Desertification" published by China Meteorological Press in March 2003.

On the periphery of the border area between oasis and the Gobi desert where pile foundation can be constructed, the single-row single-body structure of the three-dimensional framework is adopted. The pile foundation is constructed at windward side of an entrance from where sandstorm blows into. The top view of the three-dimensional framework is a protrudent arc which perpendicularly faces the windward side of the strongest wind and gradually and horizontally extends towards both sides in a curve. The length of the single-row single-body structure of the three-dimensional framework depends upon where the belt of winds moves towards, and can include several sections, and each section with a length of 200 to 300 meters. The single-row single-body structure can be disconnected according to the local topography, and then horizontally extends along a curve line. The WSBs are built 1.5 to 2 meters above the ground. The heights of the first and the second layers of WSB (depth of trough) are both 80 to 100 cm, and that of other layers are all 50 cm. A miter joint grid will be adopted between the upper and lower WSBs, and the distance between them is about 3 to 3.5 meters. The total height of the single-row single-body structure of the three-dimensional framework is 10 to 15 meters.

Along the wind direction, 50 to 80 meters behind the single-row single-body structure, the dual-row single body structure of the three-dimensional framework is adopted, whose top view is perpendicular to windward side of the strongest wind. The dual-row single body structure has a length of 40 to 50 meters and a height of about 40 meters. The distances between two water towers, tower frame, wind generating sets and the numbers of water tower, wind tower, wind power generator sets are determined by the length and the area of the vegetation both on the single-row single-body structure and on the ground. The wind power generating sets provide the electricity for pumping and storing water to irrigate all the plants. Plants can be cultivated on the leeward side of the three-dimensional framework so that they will not be mantled by sand drifts and can be provided water for absorption. Sources of water are available by digging well and pumping water.

As sandstorm flies through the three-dimensional vegetation, part of the sand will bump upon the leaves and stalks of the plants and the framework and drop to the ground around the three-dimensional framework, others will drop not far from the leeward side of the three-dimensional framework along the wind whose speed has been reduced. In general, the sand behind the vegetation screen will not be swept up again by the wind whose speed has been reduced by the three-dimensional vegetation. The height and strength of the three-dimensional frameworks can provide a sustained and strong shield against the assault of heavy sandstorms for decades, blockading the crawl of drifting dunes towards the oasis. They can protect large areas of land and lead to a benign ecological cycle.

By erecting such a high-rising framework near the entrance of supermarkets, department stores, clubs, theatres, parks, squares or beautiful scenery spots, and with the branches and leaves of the plants of vegetation, however, people may regard it as a visual pollution because it will to some extent cut off our view of beautiful buildings. Under such circumstances, the distance between the background buildings and the three-dimensional frameworks should be extended. In addition, various artistic mouldings can be designed to shape the horizontal beams and upright columns of the three-dimensional framework, so as to enrich their visual effects of beauty.

BRIEF DESCRIPTION OF THE DRAWINGS

FIG. 1-a is a general view of the coupling structure of the present invention;

FIG. 1-b is a left view of the coupling structure of the present invention;

FIG. 1-c is a partial enlarged section view of the coupling structure of the present invention;

FIG. 2-d is a top view of the coupling structure of the present invention;

FIG. 2-e is a partial enlarged sectional view of the coupling structure of the present invention;

FIG. 4-a is a general view of the dual-row single-body structure of the present invention, in which the plants are omitted;

FIG. 4-b is a left view of the dual-row single-body structure of the present invention, in which the plants are omitted;

FIG. 4-c is a partial enlarged section view of the upright column of the dual-row single-body structure of the present invention;

FIG. 6-d is a schematic view of the curve line structure of the dual-row single-body structure of the present invention;

FIG. 6-e is a schematic view of the straight line structure of the dual-row single-body structure of the present invention;

FIG. 7-a is a general view of the single-row single-body trapezoid helix structure of the present invention, in which the plants are omitted;

FIG. 7-b is a left view of the single-row single-body trapezoid helix structure of the present invention, in which the plants are omitted;

FIG. 7-c is a top view of the single-row single-body trapezoid helix structure of the present invention, in which the plants are omitted;

FIG. 8-d is a schematic view of the straight line helix structure of the single-row single-body trapezoid helix structure of this invention;

FIG. 8-e is a schematic view of the oscillation angle helix curve structure of the single-row single-body trapezoid helix structure of this invention;

FIG. 9-a is a general view of the single-row single-body structure of the present invention, in which the plants are omitted;

FIG. 9-b is an E-E direction sectional view of the single-row single-body structure of the present invention, in which the plants are omitted;

FIG. 9-c is an F-F direction sectional view of the single-row single-body structure of the present invention, in which the plants are omitted.

DETAILED DESCRIPTION OF THE PREFERRED EMBODIMENT

Figure 1:
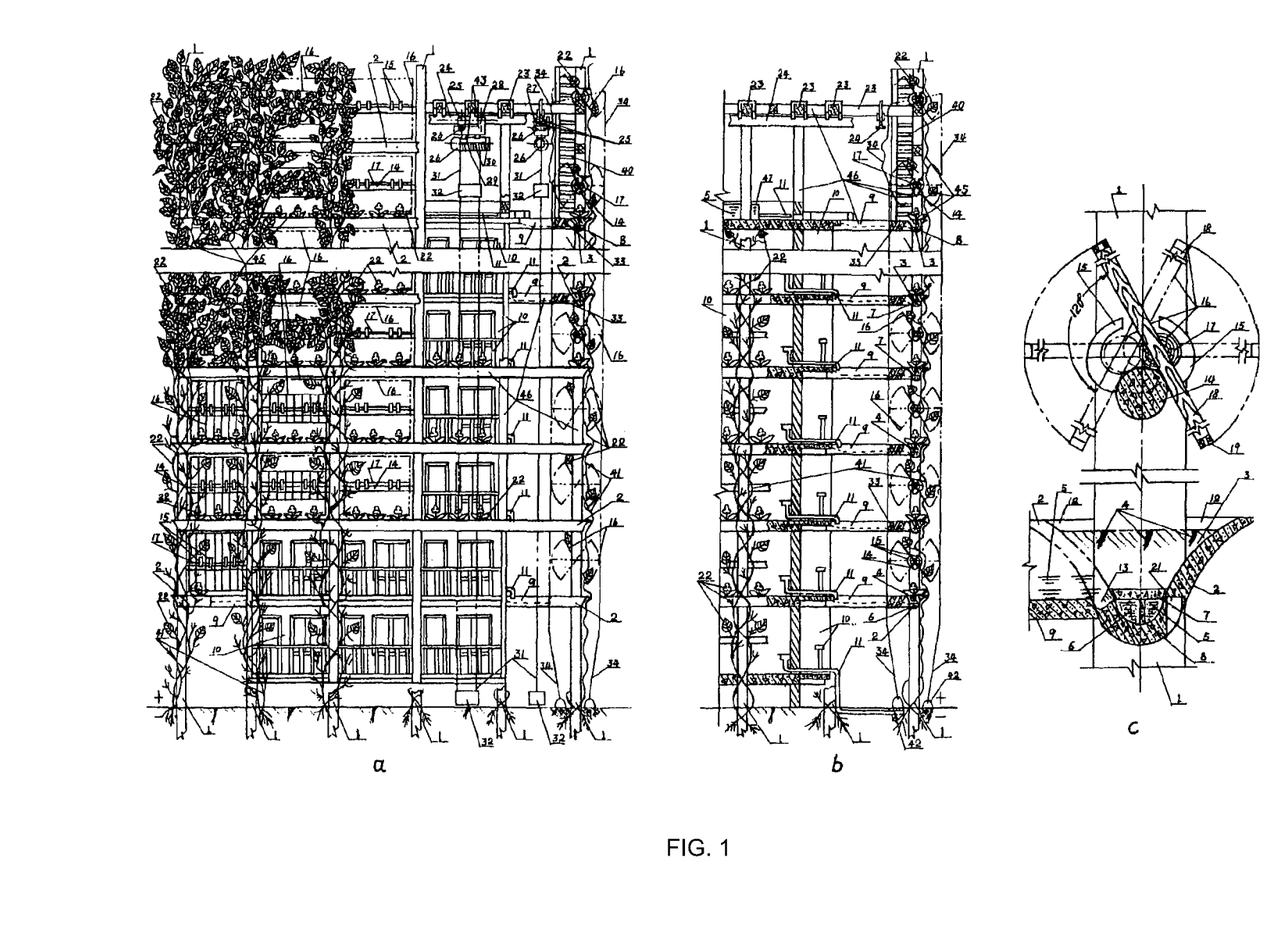
Figure 2:
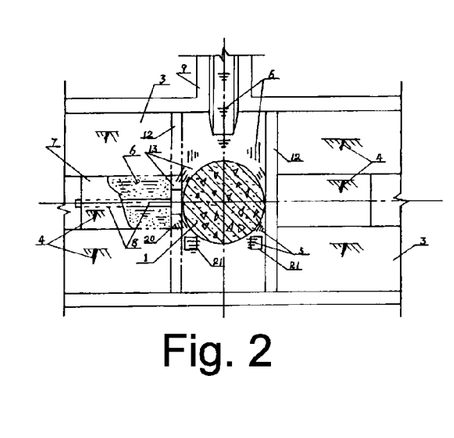

In combination with the drawings, a further disclosure of the present invention is described in the following:

Referring to the FIG. 1-a, FIG. 1-b, FIG. 1-c and FIG. 2-d, FIG. 2-e, a coupling structure is illustrated, in which a plurality of upright columns 1 are built around the east, south and west of the periphery of a high-rise building 10, wherein the upright columns 1 parallel with the outside wall of the building 10 and have a certain distance to the outside wall of the building 10 for forming a three-dimensional framework 46. A plurality of water and soil beams (WSB) 2 are horizontally and intervally mounted from a position 4 to 5 meters above the ground for holding water and soil, and on the WSB 2 is a water and soil trough 3 which is V-shape and is divided into an upper layer and a lower layer by a plurality of horizontal isolation plates 7, wherein the upper layer loads soil 4, and the lower layer loads water 5 and sand 6. The horizontal isolation plates 7 are laid piece by piece to separate water from soil. A vertical isolation plate 8 is a structure for water cycling. Each of the WSB 2 is connected to a water through (WT) 9 which is used for water to flow through, wherein the other end of the WT 9 is connected to a drainage pipe 11 of the building 10 from where the water 5 which are used by the residents in the building 10 flows to the WT 9, and then flows to the water and soil trough 3 through a water inlet 13 outside a vertical baffle plate 12, wherein the vertical baffle is provided at one end of the WSB 2. Then the water 5 flows through one side of the vertical isolation plate 8 and flows into the sand 6 for a sand recycle, after the sand recycle, the extra water 5 will drain out from at least one drainage hole 21 of a water outlet 20, wherein there is at least one drainage holes 21 provided beside the water outlet 20. At the same time, the soil 4 absorbs water 5 from the interstices among the horizontal isolation plates 7, and the water 5 can also enter into the soil 4 by evaporation.

As shown in the FIG. 1-a, FIG. 1-b, FIG. 1-c and FIG. 2-d, a holding turnover shutters beam (TSB) 14 is mounted 1.2 to 1.3 meters above the WSB 2. The TSB is used for holding and supporting turnover shutters 16 and its section is round in shape. Along the radial direction of the TSB 14, there are 2 to 6 pairs of ox-horn shaped claws 15 mounted at intervals for holding the turnover shutters 16. The turnover shutter 16 has its own axis 17, and along the axial direction, a plurality of holes are drilled on the turnover shutter 16 at intervals and a plurality of small round logs 18 are inserted into those holes respectively. Both ends of each round log 18 are connected to square logs 19 via tenon and mortise joints. Fiber ropes 34 are mounted in the middle of both edges of each turnover shutter 16, wherein on both internal and external parts of the upright columns 1, all the turnover shutters 16 in different layers are fastened together by the fiber ropes 34 from the top to the ground, so that two fiber ropes 34 are enough to adjust the angle of the turnover shutters 16 on the ground. After positioning the turnover shutters 16, the two fiber ropes 34 can be fixed on ground loops 42. The external surface of the TSB 14 is tangent to the external surface of the axis of the turnover shutter 16. The plants 22 are grown in the water and soil trough 3, and the vines, branches and leaves 41 of the plants 22 directly cover the turnover shutters 16.

As shown in the FIG. 1-a, FIG. 1-b and FIG. 2-d, a monorail slider 24 is mounted onto a top beam 23 which is mounted on the top of the three-dimensional framework 46, and an overhead trolley 43 and pulleys 25 are mounted on the monorail slider 24. An electric motor 26 drives the axis 27 of the pulley 25 to move left and right along the monorail slider 24. Under a pulley supporter 28 is a hoister mechanism 29, by which the electric motor 26 is used to drive a shaft roller 30 to roll up steel cables 31 so as to lift a basket 32, wherein the basket 32 must be hoisted to the top layer before it is moved left and right. Each layer of the three-dimensional framework 46 has a tread board 33 which is vertical to the grids of the three-dimensional framework 46, and people and goods can be transported to any tread board 33 by the basket 32.

Figure 3:
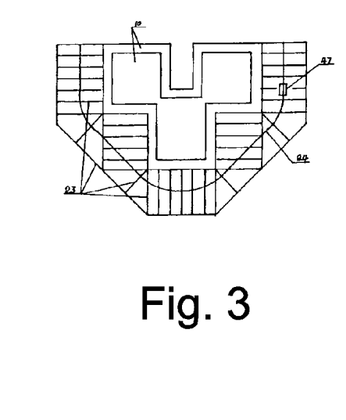
FIG. 3 is a structure schematic view of the coupling structure with the building in triangle structure.

FIG. 3 is a top view of the three-dimensional framework 46 for a coupling structure building with triangle structure. It represents one from of a variety of coupling structural forms.

What is stated above is a description of coupling structure.

Figure 4:
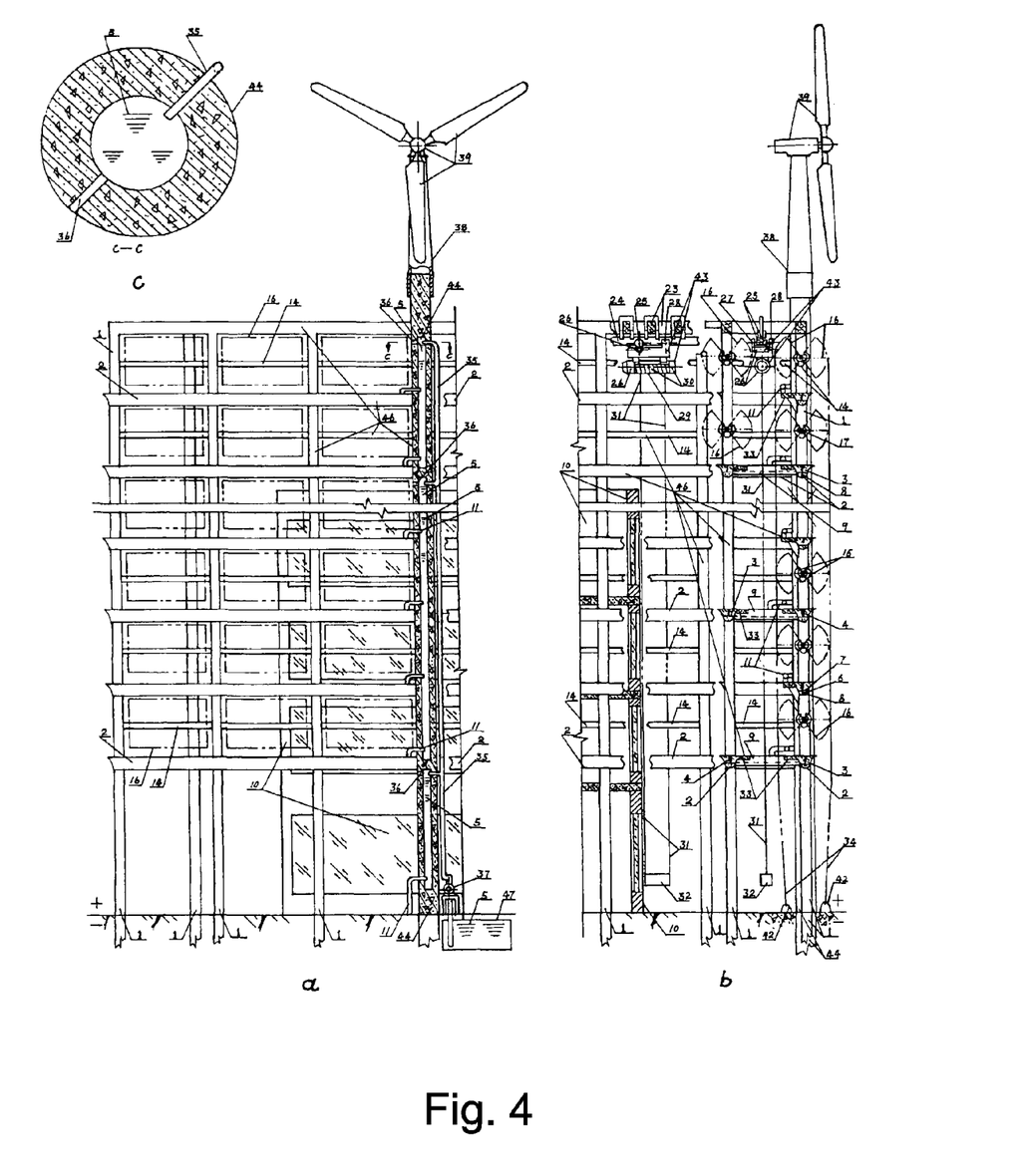
Figure 5:
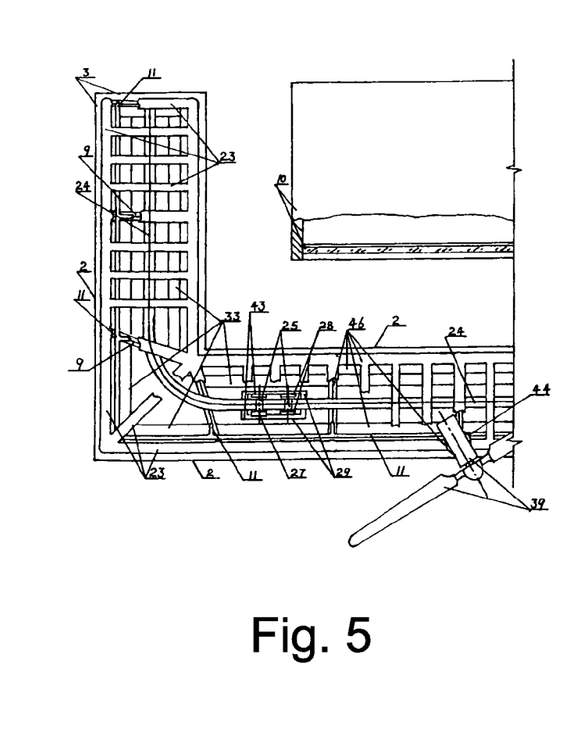
FIG. 5 is a top view of the dual-row single-body of the present invention, in which the plants are omitted.
Figure 6:
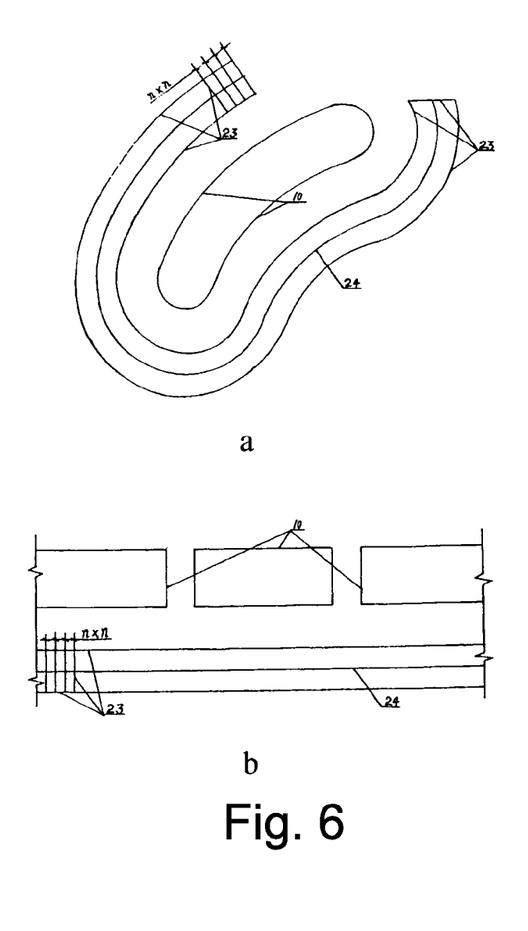

Referring to the FIG. 4-a, FIG. 4-b, FIG. 4-c and FIG. 5, when at the foot of a high-rise building are large supermarkets, department stores, clubs, or theatres, and when the buildings are auditoriums, smelting factories, or power stations with chimneys, the three-dimensional planting construction should adopt the dual-row single-body structure. FIG. 6-d and FIG. 6-e show a straight line structure and a curve line structure respectively. At a distance of 4 to 8 meters away from the building 10, a plurality of inner row upright columns 1 are mounted in parallel with the building 10 at the east, south and west directions of the building 10 for forming a three-dimensional framework 46. The inner row upright columns 1 are connected with WTs 9, and then by the WTs 9, the inner row upright columns 1 are connected with outer upright columns 1. Some upright columns 1 are built larger in diameter and with hollow centers so as to server as water towers 44 for water storage. The water towers 44 are intercepted into several sections at interval of every 3 to 5 layers' height. Each section of the water towers 44 has a water inlet pipe 35 mounted thereon, and vent holes 36 opened thereon. A water outlet pipe 11 at the bottom of each section is connected to the water inlet 13 at the upper entrance of the WSB 2. Electric controlled valves are mounted at the water supply source for controlling water supply to the high layers of the building on the ground.

Increase the height of upright columns 1 or the water towers 44 3 to 5 meters to connect a wind tower 38, so as to make the upright columns 1 or the water towers 44 as a part of the wind tower 38. The wind power generating set 39 is mounted on a wind tower 38. The electricity generated by the wind power generator set 39 can provided power for raising water 5 with pump 37, operating the overhead trolley 43 and illuminating. Water 5 lifted by the pump 37, flows through the water inlet pipe 35 and enters the water tower 44 for storage. The water 5 for irrigation can be gained from the waste water or polluted water which are roughly treated and stored in a water pool 47. Then the water 5 is pumped for irrigation by the pump 37.

The above is an explanation of what is in common and what is different between the dual-row single-body structure and the coupling structure. As to the vegetation maintenance and usage of the turnover shutters 16, the dual-row single-body structure is same to the coupling structure.

Figures 7, 8:
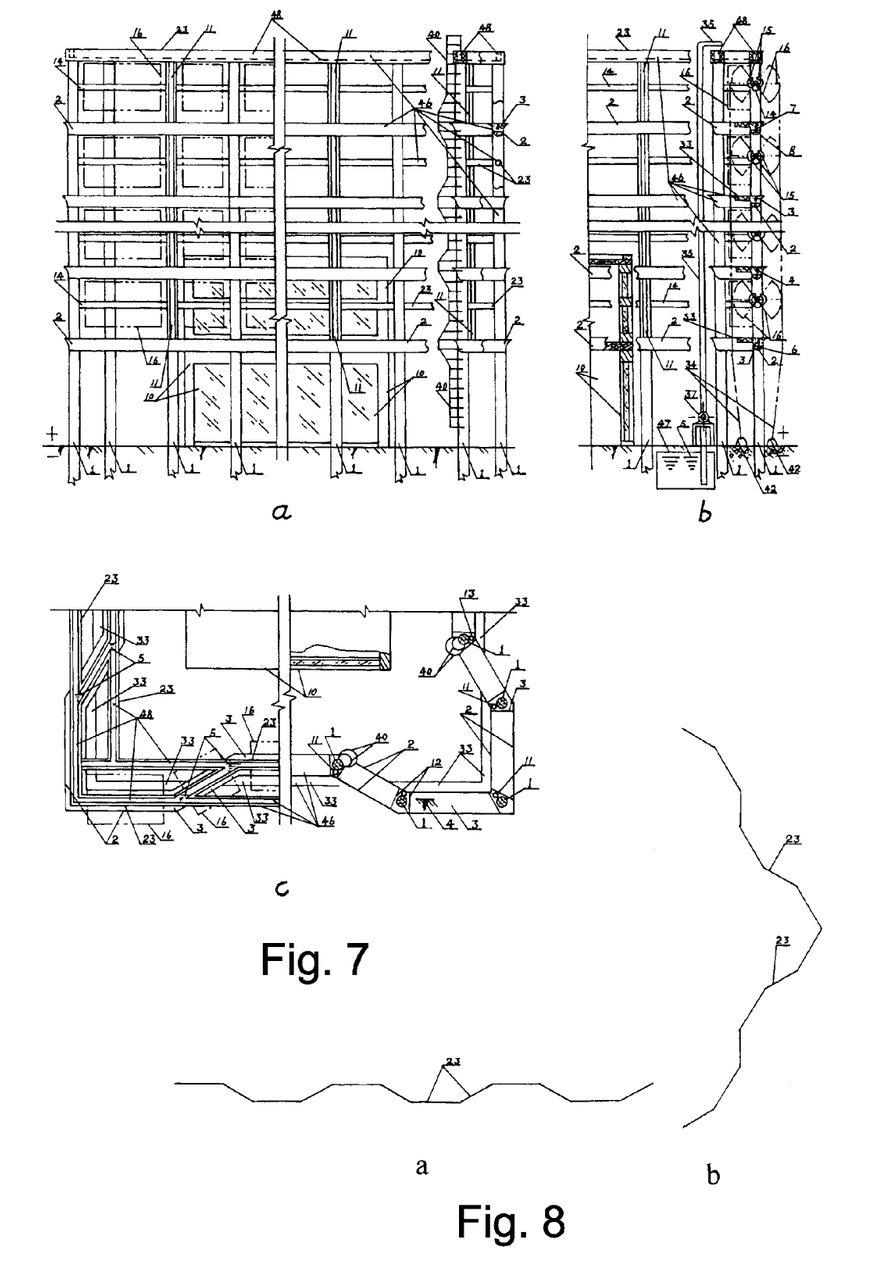

For buildings 10 like wharfs, railway stations, flyovers, factories and auditoriums, a single-row single-body trapezoid helix structure can be adopted, as shown in FIG. 7-a, FIG. 7-b, FIG. 7-c. FIG. 8-d and FIG. 8-e respectively show a straight line helix structure and an oscillation angle helix curve structure. At a certain distance away from the building 10, a plurality of upright columns 1 are mounted in parallel with the building 10 at the east, south and west directions of the building 10 for forming a three-dimensional framework 46. The height of the three-dimensional framework 46 is limited below 40 meters, and there is no overhead trolley installed thereon. Instead, a climbing ladder 40 is provided for operators to climb up and down for working. Turnover shutters 16 of the three-dimensional framework 46 are able to be chose whether install or not for the building 10 such as flyovers, auditoriums or public squares; the top beams 23 at the top of the three-dimensional framework 46 are built as communicated water troughs 48 for water storage. Water outlet pipes 11 are mounted at the bottom of the communicated water troughs 48. When no power source is available and yet a large amount of water is required, the water towers 44 of the three-dimensional framework 46 can also be built higher and serve as wind tower 38 for mounting the wind power generator sets 39 thereon, so as to provide electricity for pumping water.

The above is an explanation of what is in common and what is different between the single-row single-body trapezoid helix structure and the other two structures mentioned before. As to the vegetation maintenance and usage of the turnover shutters 16, the single-row single-body trapezoid helix structure is same to the other two structures mentioned before.

Figure 9:
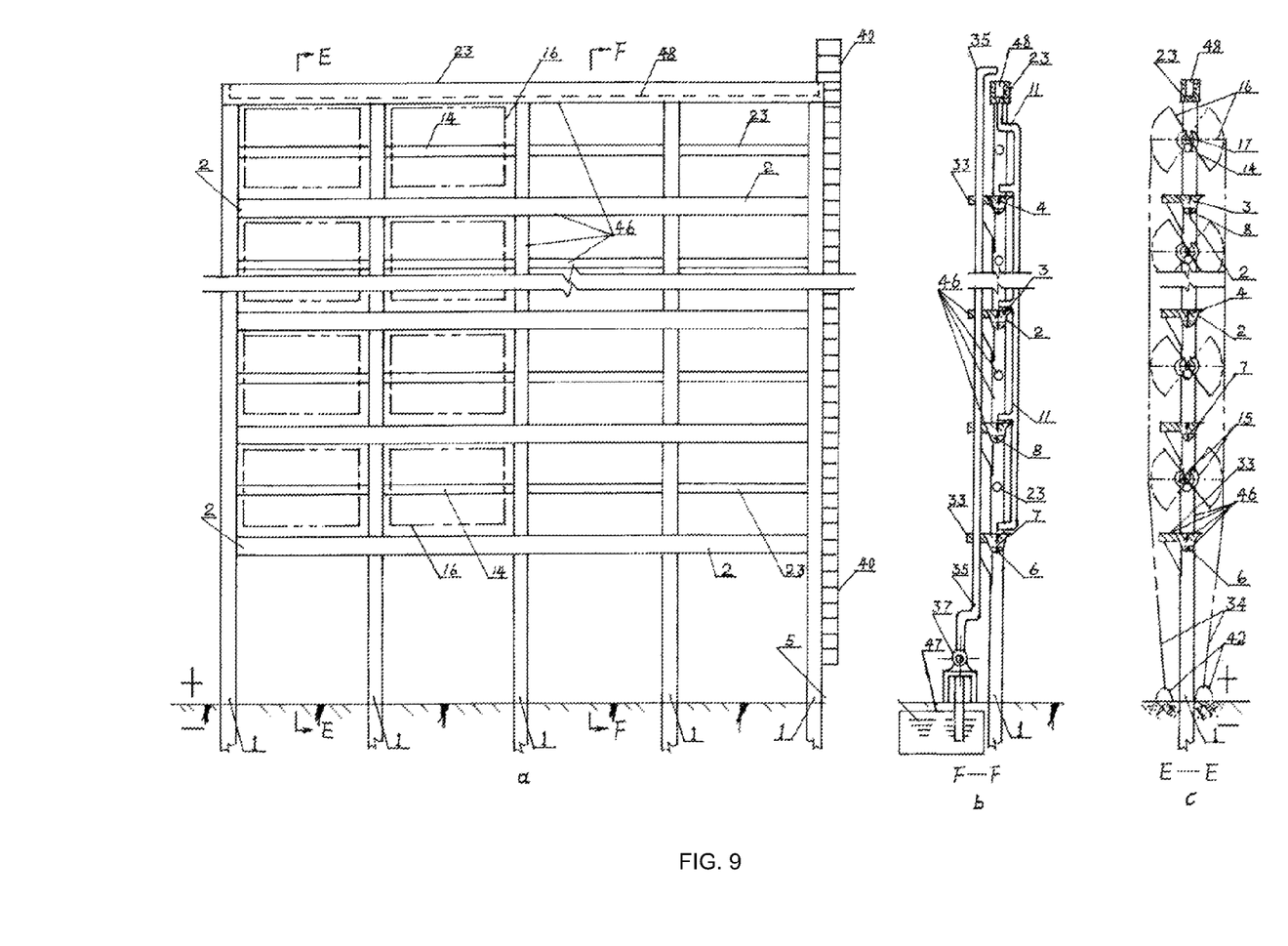

For the lower buildings, such as both sides of expressways and railways, squares, highways and factories, a single-row single-body structure can be adopted, as shown in FIG. 9-*a*, FIG. 9-*b*, FIG. 9-*c*. Both straight and curve line structure are shown. At a certain distance away from the building 10, a plurality of upright columns 1 are mounted in parallel with the building 10 at the east, south and west directions of the building 10 for forming a three-dimensional framework 46. The height of the three-dimensional framework 46 is limited below 20 meters, and there is no overhead trolley installed thereon. Instead, a climbing ladder 40 is provided for operators to climb up and down for working. The top beams 23 at the top of the three-dimensional framework 46 are built as communicated water troughs 48 for water storage. Water outlet pipes 11 are mounted at the bottom of the communicated water troughs 48. Turnover shutters 16 of the three-dimensional framework 46 are able to be chose whether install or not. Pump 37 is adopted to raise water.

The above is an explanation of what is in common and what is different between single-row single-body structure and the other three structures mentioned before. As to the vegetation maintenance and usage of the turnover shutters 16, single-row single-body structure is same to the other three structures mentioned before.

What is claimed is:

1. A three-dimensional planting construction for a building comprises:
    a three-dimensional framework which is made from concrete and wood and constructed around the building,
    plants provided on the three-dimensional framework,
    water for plants to grow, wherein the water come from well water or waste water purified roughly,
    soil for plants to grow,
    a plurality of turnover shutters adapted for adjusting shade and light, wherein the water, the soil and the turnover shutters are supported on the three-dimension framework,
    a pump for pumping water to irrigate the plants,
    an overhead trolley mounted on the three-dimensional framework for transporting people and goods, and
    at least one wind power generator set for supplying power to the pump and the overhead trolley,
    wherein the three-dimensional framework comprises
    a plurality of upright columns mounted around the building, wherein the upright columns are parallel with an outer wall of the building and have a distance to the outer wall of the building,
    a plurality of water and soil beams are mounted horizontally to the upright columns from a position 4 to 5 meters above the ground, and
    a plurality of water and soil troughs, each of said water and soil troughs provided on one of said water and soil beams and adapted for holding water and soil therein,
    wherein the upright columns are enlarged in diameter and have hollow centers so as to serve as water tower for storing water, and the three-dimensional framework further comprises a plurality of water troughs, wherein each of said water troughs is connected to one of the water and soil beams at one end of said water trough and used for the water to flow through, wherein another end of the water trough is connected to a drainage pipe of the building from where the water used by residents in the building flows to the water troughs, and then flows to the water and soil troughs,
    wherein the upright columns with the hollow centers are intercepted into several sections at interval of every 3 to 5 layers height, wherein each of the sections has a water net pipe mounted thereon, air vent holes opened thereon, and the drainage pipe at a bottom of each section,
    wherein each of the water and soil trough is V-shaped and is divided into an upper layer and a lower layer by a plurality of horizontal isolation plates, wherein the upper layer loads the soil, and the lower layer loads the water,
    wherein three-dimensional framework further comprises a plurality of holding turnover shutters beams adapted for holding and supporting the turnover shutters, wherein each of said turnover shutters beams is mounted 1.2 to 1.3 meters above the water and soil beams, wherein along a radial direction of the turnover shutters beams, there are 2 to 6 pairs of ox-horn shaped claws mounted at intervals for holding the turnover shutters, wherein each of the turnover shutters has its own axis, and along an axial direction, a plurality of holes are drilled on said each turnover shutter at intervals and a plurality of small round logs are inserted into those holes respectively, and
    wherein a monorail slider is mounted onto a top beam which is mounted on a top of the three-dimensional framework, the overhead trolley and a plurality of pulleys are mounted on the monorail slider, wherein an electric motor drives an axis of the pulley to move left and right along the monorail slider, wherein under a pulley supporter is a hoister mechanism and the electric motor rolls up steel cables by the hoister mechanism so as to lift a basket, wherein each layer of the three-dimensional framework has a tread board, wherein people and goods can be transported to any tread board by the basket; and
    wherein the three-dimensional framework are 5 to 10 meter higher than the building.

2. The three-dimensional planting construction, as recited in claim 1, wherein the three-dimensional framework has four types of structure:
    coupling structure, dual-row single-body structure, single-row single-body trapezoid helix structure, and single-row single-body structure.

3. The three-dimensional planting construction, as recited in claim 2, wherein when at the foot of a high-rise building are large supermarkets, department stores, clubs, or theatres, and when the buildings are auditoriums, smelting factories, or power stations with chimneys, the dual-row single-body structure is adopted, in which at a distance of 4 to 8 meters away from the building, a plurality of inner row upright columns are mounted in parallel with the building at the east, south and west directions of the building, and a plurality of outer row upright columns are mounted in parallel with the inner row upright columns and connected to the inner row upright columns by said water troughs, wherein there is a distance between the inner row upright columns and the outer row upright columns.

4. The three-dimensional planting construction, as recited in claim 1, wherein the diameters of the upright columns are enlarged, wherein a top part of the upright columns is served as a part of a wind tower and the wind power generator sets are mounted on the wind towers.

5. A three-dimensional planting construction for a building comprises:
a three-dimensional framework which is made from concrete and wood and constructed around the building,
plants provided on the three-dimensional framework,
water for plants to grow, wherein the water come from well water or waste water purified roughly,
soil for plants to grow,
a plurality of turnover shutters adapted for adjusting shade and light, wherein the water, the soil and the turnover shutters are supported on the three-dimension framework,
a pump for pumping water to irrigate the plants,
an overhead trolley mounted on the three-dimensional framework for transporting people and goods, and
at least one wind power generator set for supplying power to the pump and the overhead trolley,
wherein a plurality of upright columns are built around the east, south and west of a periphery of the building, wherein the upright columns are parallel with an outside wall of the building and have a distance to the outside wall of the building so as to form the three-dimensional framework,
a plurality of water and soil beams are horizontally built 4 to 5 meters above the upright columns for holding water and soil, a plurality of water and soil troughs provided on said water and soil beams,
a plurality of vertical water troughs are connected to the building, each of said water troughs is connected to a drainage pipe of a residence from where waste water flows through the water troughs to the water and soil beams, each of said water and soil troughs is divided into an upper layer and a lower layer by a plurality of horizontal isolation plates to separate soil and water, wherein the upper layer holds soil and the lower layer holds water and sand, each of the water and soil trough is V-shaped, the horizontal isolation plates are laid piece by piece, and there are interstices among the horizontal isolation plates and the water and soil beams,
a plurality of vertical isolation plates under the horizontal isolation plates for water recycling, each of the vertical isolation plates extends one third of a total length of each of said water and soil beams, and
on both sides of the upright columns are vertical plates for blockading water and soil, wherein water flows over from the water troughs between upright columns and enters the water and soil troughs through water inlet holes under the vertical plates at one end, sand at the water inlets has a diameter of 3 to 5 mm, and sand at middle part and at water outlets has a diameter of 0.5 to 1.5 mm, wherein when water level approaches the horizontal isolation plates, extra water will flow out from the water outlets under the vertical plates at other end.

6. The three-dimensional planting construction, as recited in claim 5, wherein at 1.2 to 1.3 meters above the WSB is holding turnover shutters beam (TSB) for holding and supporting turnover shutters, along a radial direction of the TSB, there are 2 to 6 pairs of ox-horn shaped claws mounted at intervals for holding an axis of the turnover shutters, an external surface of the TSB is tangent to the external surface of the axis of the turnover shutter, so that by pulling a rope inside or outside the turnover shutter, it can be revolved up and down, the upper edge of the turnover shutter is capable of turning downside towards an inner side of the upright column by 120° to 130°, allowing to adjust green shade, direct sunlight or illumination according to requirements, the axis of the turnover shutter is a round fir log with a diameter of 180 to 200 mm, along an axial direction of the turnover shutter, a plurality of holes are drilled on the turnover shutter at intervals and a plurality of small round logs with diameters of 50 to 60 mm are inserted into said holes respectively, a plurality of square logs with drilled holes are attached onto the ends of said small round logs so as to form a grid, an inner and an outer fiber ropes are provided to respectively fasten upper and lower edges of the turnover shutter, and all the turnover shutters in different layers are fastened together by the fiber ropes from a top to a ground, the angle of the turnover shutters can thus be adjusted by pulling fiber ropes on the ground.

7. The three-dimensional planting construction, as recited in claim 6, wherein the overhead trolley is powered either with a DC or an AC electric motor, on which pulleys of the overhead trolley are driven to move left or right in horizontal along an edge of a slider by applying force on an axis of the pulleys, under a pulley supporter is a hoister mechanism, in which the DC or AC electric motor is used to drive a shaft roller to roll up steel cables so as to lift a basket, wherein a lift weight of the hoister mechanism is less than one ton.

* * * * *